US012478819B2

(12) United States Patent
Poltimäe

(10) Patent No.: US 12,478,819 B2
(45) Date of Patent: Nov. 25, 2025

(54) REVOLUTE JOINT WITH MOVEMENT LIMITER FOR CONNECTING JUMP ROPE BALL BEARING POST AND QUICK RELEASE SYSTEM

(71) Applicant: Bodyhackerz OÜ, Harju maakond (EE)

(72) Inventor: Martin Poltimäe, Rae vald (EE)

(73) Assignee: Bodyhackerz Oü, Tallinn (EE)

( * ) Notice: Subject to any disclaimer, the term of this patent is extended or adjusted under 35 U.S.C. 154(b) by 50 days.

(21) Appl. No.: 18/633,783

(22) Filed: Apr. 12, 2024

(65) Prior Publication Data
US 2024/0342531 A1 Oct. 17, 2024

Related U.S. Application Data

(60) Provisional application No. 63/495,920, filed on Apr. 13, 2023.

(51) Int. Cl.
A63B 5/20 (2006.01)
F16C 11/06 (2006.01)
F16G 11/10 (2006.01)

(52) U.S. Cl.
CPC ............ A63B 5/20 (2013.01); F16C 11/0623 (2013.01); F16G 11/10 (2013.01)

(58) Field of Classification Search
CPC ......... A63B 5/20; F16C 11/0623; F16G 11/10
See application file for complete search history.

(56) References Cited

U.S. PATENT DOCUMENTS

| 12,005,288 B1* | 6/2024 | Carroll ............. A63B 23/03508 |
| 2014/0243164 A1* | 8/2014 | Suplee ..................... A63B 5/20 482/82 |
| 2015/0119206 A1* | 4/2015 | Newman .................. A63B 5/20 482/82 |
| 2020/0030653 A1 | 1/2020 | Hunt |
| 2021/0170219 A1* | 6/2021 | Lewis ................ A63B 21/4035 |
| 2023/0249021 A1 | 8/2023 | Poltimäe |

* cited by examiner

Primary Examiner — Andrew S Lo
(74) Attorney, Agent, or Firm — Koivula & Somersalo, LLC

(57) ABSTRACT

The ball bearing post and quick release system with revolute joint, and its movement limiter makes the use of the jump rope more convenient and safer for the user. The presented solution includes a clevis with a movement limiter in the ball bearing post and a tang in the quick release system joined together with a fastening element, and together forming a revolute joint. The movement limiter prevents movement of the quick release system to the extent that the quick release system cannot move against user's hand, or against the ball bearing housing located at the top of the jump rope handle.

9 Claims, 7 Drawing Sheets

REVOLUTE JOINT WITH MOVEMENT LIMITER FOR CONNECTING JUMP ROPE BALL BEARING POST AND QUICK RELEASE SYSTEM

PRIORITY

This application claims priority of U.S. provisional application No. 63/495,920 filed on Apr. 13, 2023, the contents of which are incorporated herein by reference.

TECHNICAL FIELD OF THE DISCLOSURE

This disclosure is related to technical equipment for physical training, and more specifically to jump rope devices.

BACKGROUND

Due to the increasing understanding of health benefits of aerobic exercise, jump ropes which were previously considered as children's devices have become a popular exercise device for adults. Exercise with jump rope can provide an efficient cardiovascular workout with high calory burnout.

Along with increasing popularity of jump ropes as efficient exercise devices, the jump ropes have been developed to have various adjustable features to provide a suitable jump rope for every level of users. For example, the cables may come with different weights and same handles may be used interchangeably with multiple cables. In order to change a cable, the jump rope has to have an efficient, stable and still effortless and rapid system to change the cable.

To address the release of the handles from the jump rope, US 20230249021 discloses a quick release connection for a jump rope. Similarly, US 20200030653 discloses a jump rope device having a male and female connecting members for quick release of the handles.

However, while these solutions allow releasing and attaching ropes onto the handles and thus enable modifying the jump rope device for different exercise level, these handles still have space for improvements, for example in terms of free rotation of the rope in relation to the handles and securing such that the quick release is not accidentally activated. Moreover, there may be issues where the connecting parts may occasionally touch each other and make annoying clicking noises.

SUMMARY

This disclosure provides solutions at least to the above flaws of the known art.

This disclosure provides a revolute joint with a movement limiter between the ball bearing post and the quick release system of the jump rope, to limit the range of movement of the quick release system, so it cannot move against the user's hand or the ball bearing housing located at the top of the jump rope handle, thus making the use of the jump rope more convenient and safer for the user.

The upper part of the ball bearing post of the present invention includes a clevis with a movement limiter that may be a rubber bushing in the bottom of the recess of the clevis. Materials other than rubber may also be used, e.g. various plastic materials. At the end of the quick release system there is a tang, which is attached to the clevis of the ball bearing post with a fastening element such as a pin or screw posts to connect moving parts, resulting in a revolute joint, which allows the quick release system to rotate along a common axis with ball bearing post.

According to certain aspects of the invention it is provided a revolute joint configured to connect a jumping rope cable and a jumping rope handle having a ball bearing in a ball bearing housing, wherein the revolute joint comprises:
- a cable connector configured to detachably receive one end of the jumping rope cable;
- a quick release system configured to release the cable connector;
- a ball bearing post comprising a cylindrical part configured to be attached to the ball bearing inside the ball bearing housing in the jumping rope handle and a substantially U-shaped clevis, sides of which form two fastening members each having a hole to receive a fastening element being a clevis pin or screw posts, and a recess at the bottom of the substantially U-shaped clevis;
- a substantially T-shaped movement limiter having a wide upper part and a narrow lower part, and being configured to fit into the U-shaped clevis such that the narrow lower part is supported by a bottom of the recess, and ends of the wide upper part are configured to protrude into two opposite directions outside of space between the fastening members, and wherein
- the cable connector is a cylindrical tube having an open first end configured to receive the end of the jump rope cable, and a second end attached to a first end of the quick release system;
- the quick release system comprising a tang in a second end,
  - the tang having a tang opening and the tang configured to fit into the recess between the fastening members of the U-shaped clevis above the movement limiter, and being attached between the two fastening members by the fastening element, such as clevis pin or screw posts, penetrating the holes of the two fastening members and the hole of the tang;

wherein protruding ends of the movement limiter are configured to limit movement of the quick release system by preventing the quick release system from touching the ball bearing housing.

According to certain aspects the movement limiter may be a rubber or plastic bushing element.

According to certain aspects the movement limiter may be interchangeable.

The movement limiter may have an opening through which the limiter is attachable with a screw through a screw hole in one or both of the fastening elements of the clevis.

According to certain aspects of the invention the movement limiter prevents movement of the quick release system from being more than 130 degrees in relation to a longitudinal axis of the clevis and the ball bearing post.

According to certain aspects the movement limiter limits rotating movement of the quick release system to be between 90 and 130 degrees.

Certain aspects of the invention provide an exercise kit comprising a jumping rope with revolute joints, a multitude of interchangeable movement limiters each one configure to fit into the U-shaped clevis such that the narrow lower part is supported by a bottom of the recess between the fastening members, and ends of the wide upper part are configured to protrude into two opposite directions outside of the space between the fastening members, and optionally a multitude of interchangeable jumping rope cables.

DETAILED DESCRIPTION OF THE INVENTION

Figure 1:
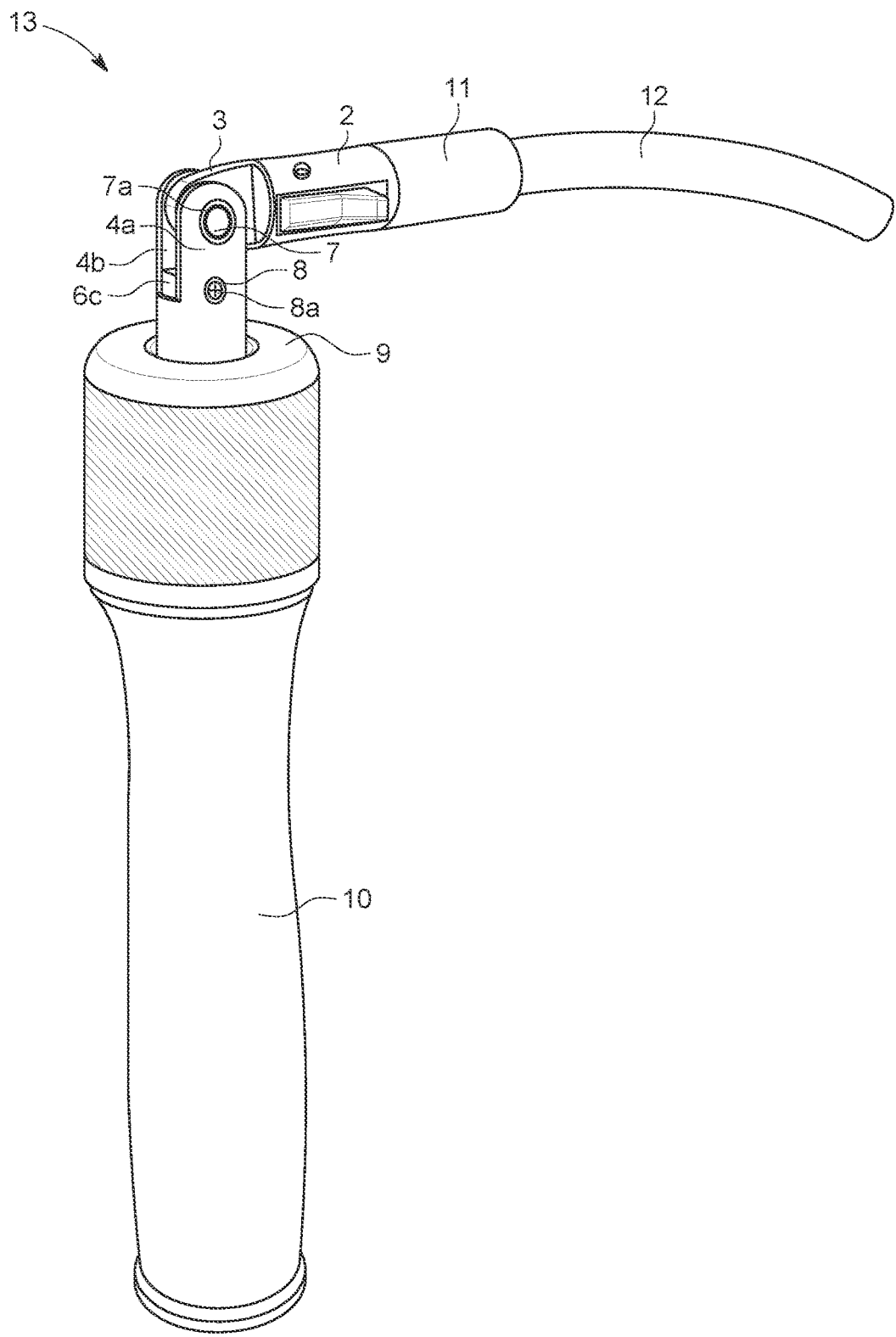
FIG. 1 is a perspective view of the jump rope with a revolute joint and movement limiter connecting the jump rope ball bearing post and quick release system.
Figure 2C:
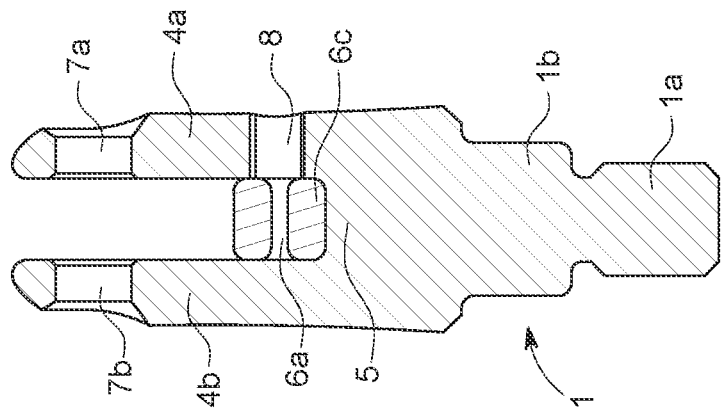
FIG. 2C is a cross-sectional view of the ball bearing post with clevis and movement limiter.
Figure 2B:
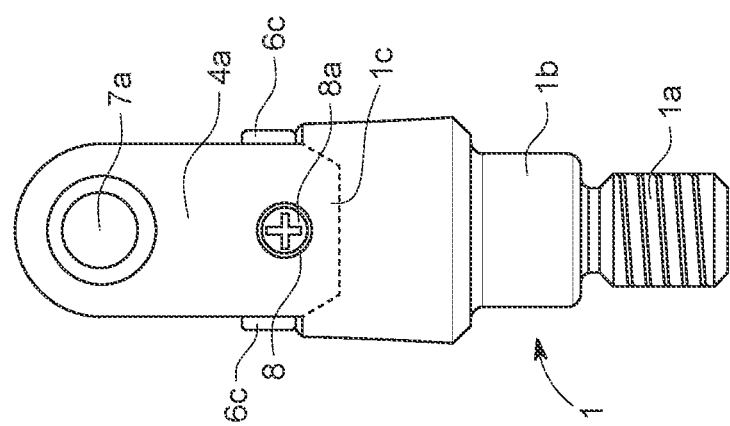
FIG. 2B is a side view of the ball bearing post with the clevis and the movement limiter.
Figure 2A:
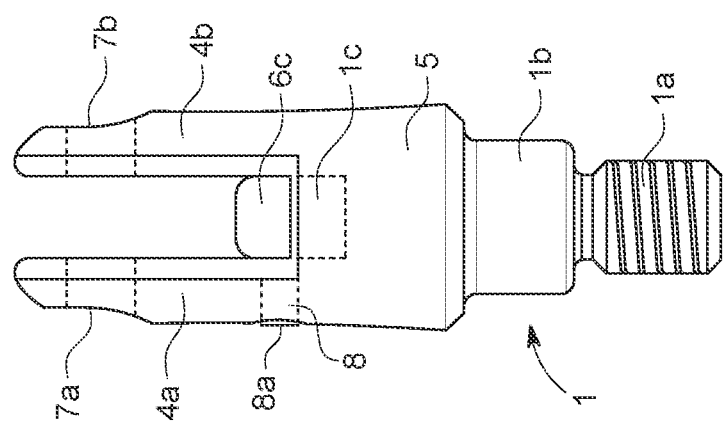
FIG. 2A is a front view of a ball bearing post with a clevis and the movement limiter.

The invention is now described in detail with reference to the appended drawings. The presented solution comprises jump rope 13 having handles 10 at both ends of a rope, each of the handles have a ball bearing post 1 with clevis 5 and quick release system 2 with tang 3 and tang opening 3a, which are jointed together with fastening element 7 which may be for example a pin or a screw post, and together form a revolute joint that limits the movement of the quick release system 2. FIG. 1 shows a handle 10 having a ball bearing inside a ball bearing housing 9. Ball bearing post is inserted into the ball bearing and only the clevis part of the bearing post is visible in the figure. The quick release system 2 is attached to the clevis with a fastening element 7 being e.g. a clevis pin or screw posts and the cable 12 is attached to the quick release system via a cable connector 11. FIGS. 2A-2C show the ball bearing post comprising the U-shaped clevis 5. The movement limiter 6 is shown at bottom of the recess 1c between the fastening members 4a, b. In the lower part of the ball bearing post 1 there is a cylindrical part 1a configured to pass through a ball bearing inside the ball bearing housing and threaded part 1b, to which a nut goes, which nut locks the ball bearing to the cylindrical part 1a passing through the ball bearing.

Clevis 5 of the ball bearing post 1 contains two fastening members 4a,4b in its upper part having aligned openings 7a,7b for receiving a fastening element 7 such as a clevis pin or screw posts. The clevis 5 is substantially U-shaped and has a recess in its bottom 1c for mounting the movement limiter 6 which may be an interchangeable T-shaped movement limiter 6. Fastening member 4a has an opening 8 for a screw 8a to lock the movement limiter 6 with the screw 8a. The movement limiter 6 has an opening 6a into which the screw 8 is attached.

Figure 3A:
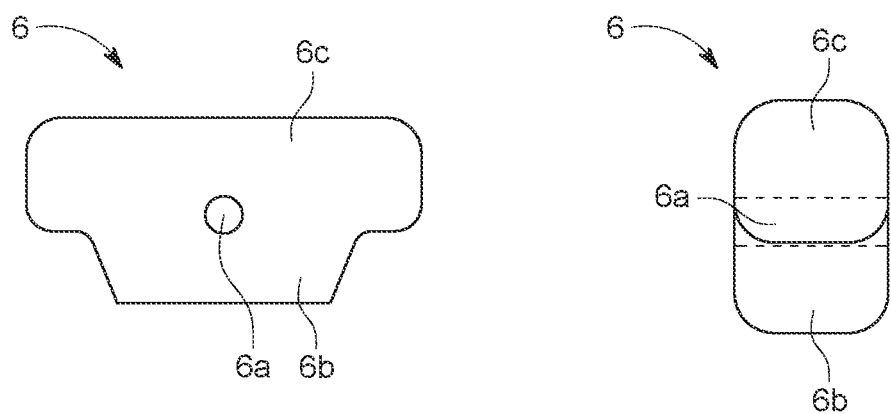
FIG. 3A shows front and side views of the movement limiter having a wide upper part and a narrower lower part, and an opening for fastening the movement limiter.
Figure 3B:
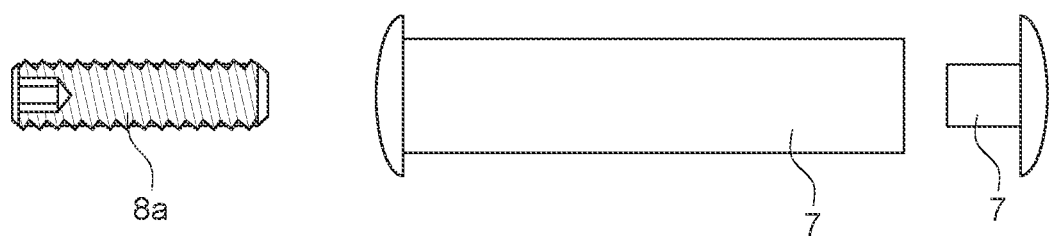
FIG. 3B shows the screw configured to fasten the movement limiter. Furthermore, the figure shows a fastening element, here exemplary wise a clevis pin, configured to attach the tang of the quick release system to the fastening members of the clevis.
Figure 6:
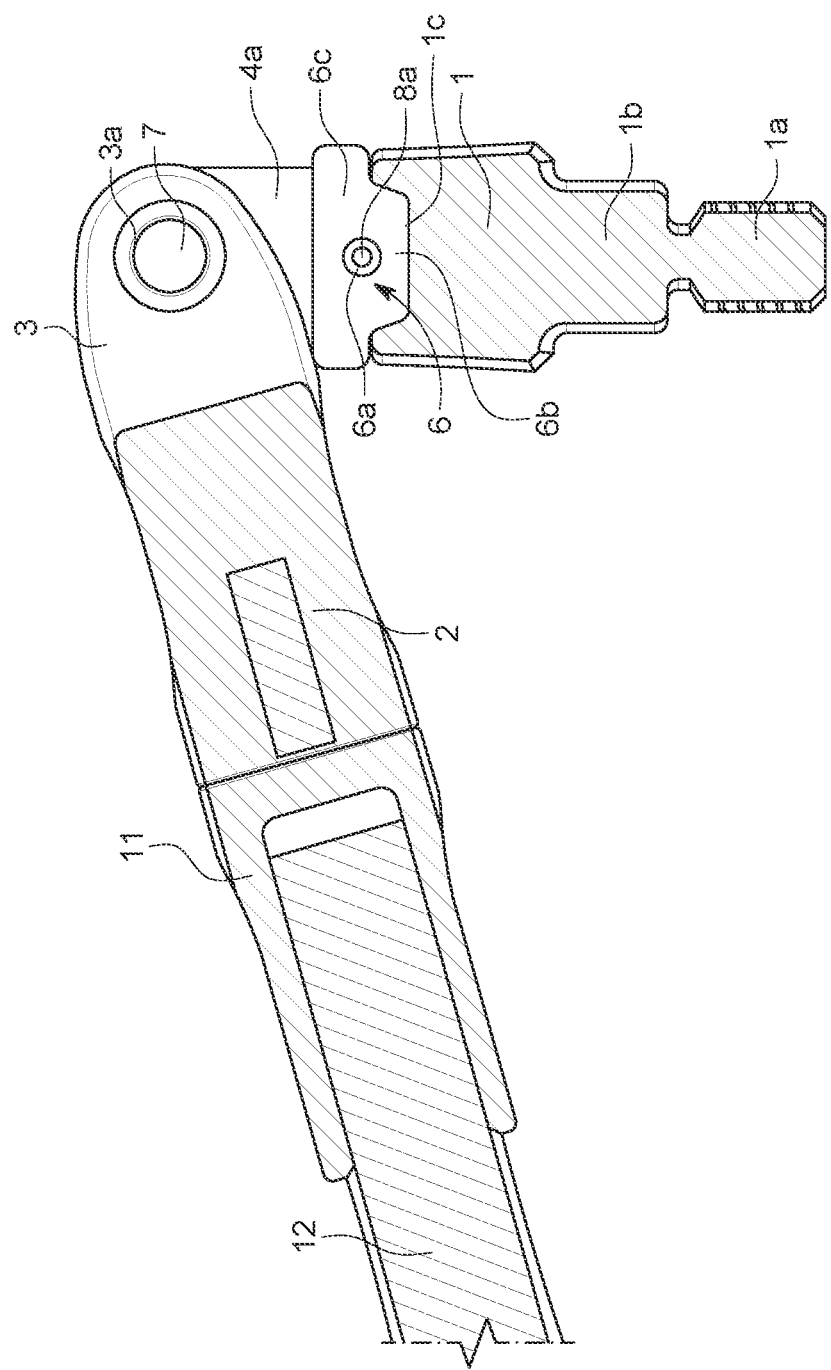
FIG. 6 shows a cross-section of connected ball bearing post and quick release system, where the quick release system movement is limited by the movement limiter.

FIG. 3A illustrates the movement limiter 6 in more details. The movement limiter is a substantially T-shaped element. The movement limiter has an upper part that is wide in one plane 6c and a lower part that is narrower in the one plane 6b. The movement limiter is configured to be inserted into a recess in the bottom 1c of the clevis, such that the narrow lower part 6b rests on the bottom of the recess as shown e.g. in FIGS. 2A, B. The wider upper part 6c extends outside the clevis into two directions (visible in FIG. 6). These extending parts of the movement limiter will prevent the quick release system 2 to touch the ball bearing post 1 (see FIG. 6). The quick release system may be the quick release system disclosed in US 20230249021. The movement limiter may be of rubber or plastic, and it may be interchangeable for example upon wearing after heavy use of the jumping rope. The movement limiters may come with different heights of the upper part, thus limiting the movement of the quick release system more or less.

Figure 4:
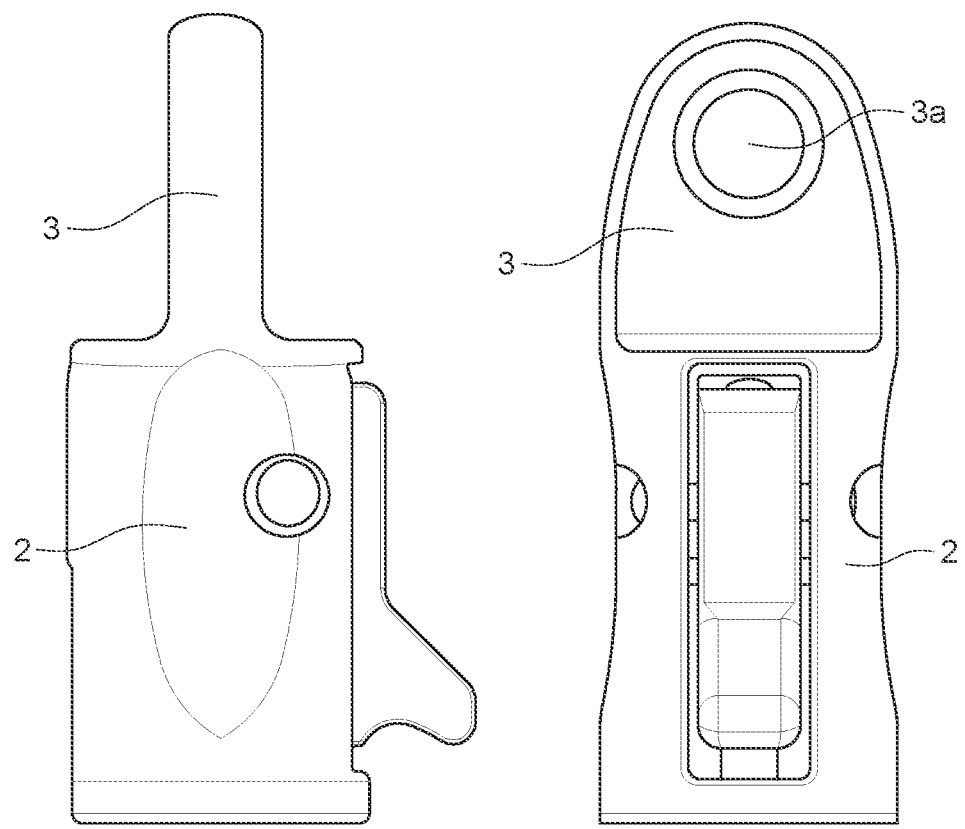
FIG. 4 illustrates front and side views of the quick release system with tang and tang opening.
Figure 5:
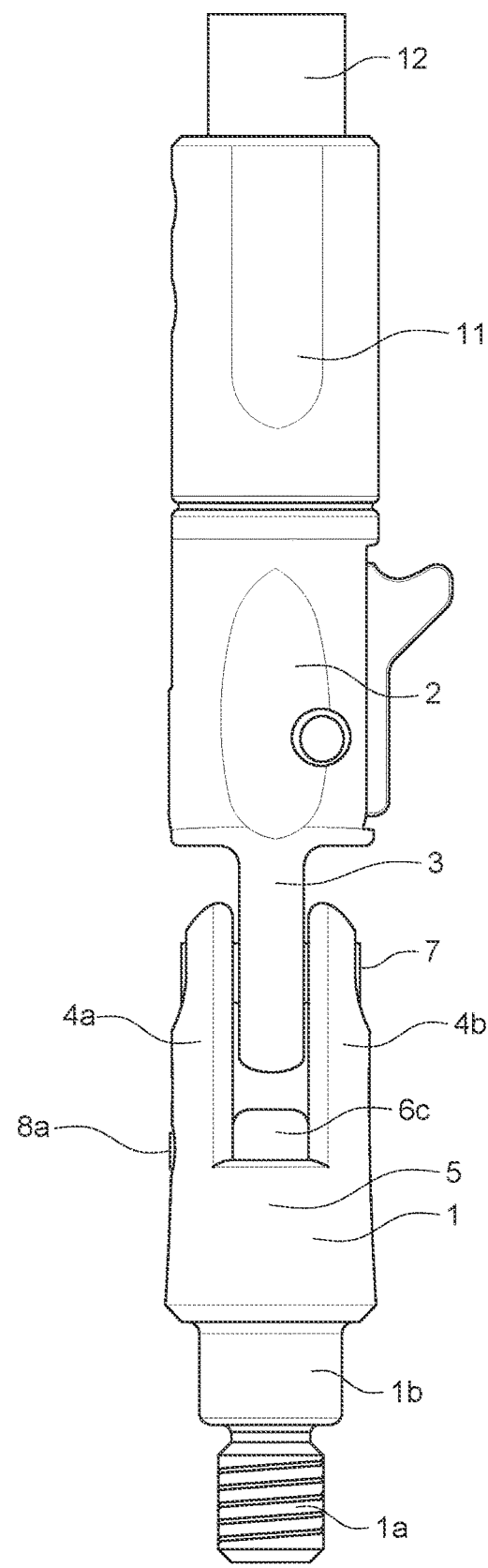
FIG. 5 is a front view of connected ball bearing post and quick release system with connected cable.

As is shown in FIG. 4, the quick release system 2 has a tang 3 with an opening 3a. As shown in FIG. 5, the tang 3 is connected to the clevis 5 with a fastening element, e.g. clevis pin or screw posts 7, passing through the tang opening 3a and openings 7a, 7b for the clevis pin or screw posts. Connected tang 3 and clevis 5 together form a revolute joint constraining the motion of two bodies to pure rotation along a common axis. This revolute joint does not allow any translation or sliding linear motion.

Figure 7:
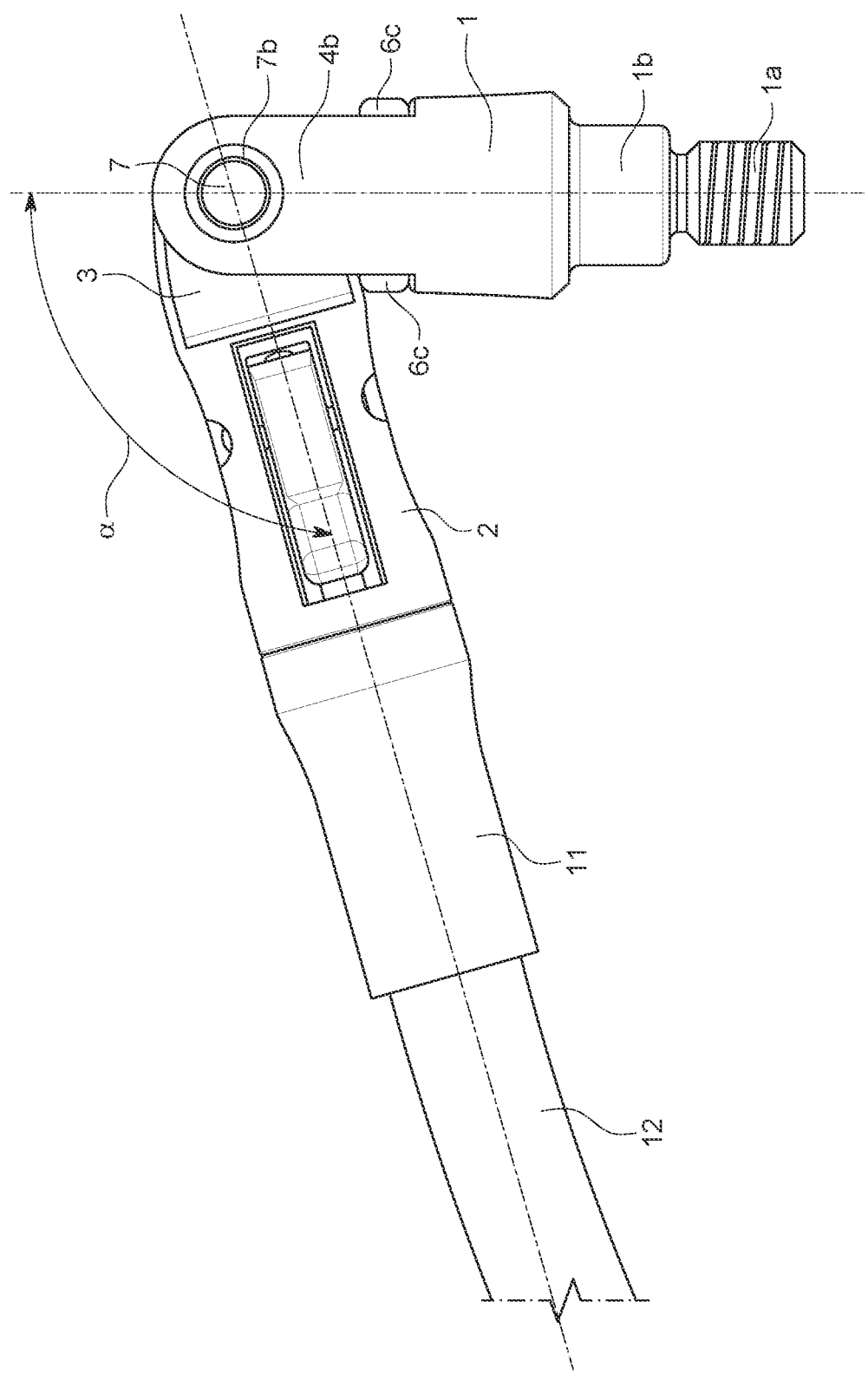
FIG. 7 is perspective view of the ball bearing post and quick release system, where movement limiter allows the quick release system to move in relation to the longitudinal axis passing through the ball bearing post to an angle of approximately up to a degrees.

The movement limiter 6, featured on the ball bearing post 1 allows the quick release system 2 to move in two directions in relation to the longitudinal axis passing through the ball bearing post 1 (shown in FIG. 7) to an angle α (movement to one direction is shown in FIG. 7). The angle α is preferably between 90 and 130 degrees (FIG. 7).

An advantage of the solution provided in this disclosure is that if, while using the jump rope 13, the user wants to hold as close as possible to the upper edge of the ball bearing housing 9, the revolute joint with movement limiter 6, being for example a rubber or plastic bushing, will limit the movement of the quick release system 2 in such a way that the quick-release system 2, the cable connector 11 and the cable 12 cannot move against the user's hand.

Another advantage of the presented invention is that if the user prefers to grip from the jump rope handle 10 area, while using the jump rope 13, then this solution limits the movement of the quick-release system 2 in such a way that the quick-release system 2 and cable connector 11 cannot move against the ball bearing housing 9—this ensures that no clicking noises and mechanical damage occurs as the elements would never collide.

The disclosed revolute joint enables the user to replace the movement limiter 6 in case it wears out or gets damaged. The main function of the movement limiter is to limit the movement of quick release system 2 and to ensure that no clicking noises or mechanical damage occurs when the movement limiting takes place.

LISTING OF ELEMENTS

1—ball bearing post
1a—cylindrical part passing through the ball bearing
1b—threaded part of the ball bearing post
1c—recess in the bottom of the clevis
2—quick release system
3—tang 3a—tang opening
4a,b—fastening members
5—clevis
6—movement limiter
6a—movement limiter opening
6b—lower part of movement limiter
6c—upper part of movement limiter
7—fastening element such as clevis pin/screw posts
7a, 7b—opening for fastening element
8—opening for screw
8a—screw
9—ball bearing housing
10—jump rope handle
11—cable connector
12—cable
13—jump rope

What is claimed is:

1. A revolute joint configured to connect a jumping rope cable and a jumping rope handle having a ball bearing in a ball bearing housing, wherein the revolute joint comprises:
   a cable connector configured to detachably receive one end of the jumping rope cable;
   a quick release system configured to release the cable connector;
   a ball bearing post comprising a cylindrical part configured to be attached to the ball bearing inside the ball bearing housing in the jumping rope handle and a substantially U-shaped clevis, sides of which form two fastening members each having a hole to receive a fastening element, and a recess in bottom of the U-shaped clevis;
   a substantially T-shaped movement limiter having a wide upper part and a narrow lower part, and being configured to fit into the U-shaped clevis such that the narrow lower part is supported by a bottom of the recess, and ends of the wide upper part are configured to protrude into two opposite directions outside of space between the fastening members,
   and wherein
      the cable connector is a cylindrical tube having an open first end configured to receive the end of the jump rope cable, and a second end attached to a first end of the quick releases system;
      the quick release system comprising a tang in a second end,
      the tang having a tang opening and the tang configured to fit into the space between the fastening members of the U-shaped clevis above the movement limiter, and being attached between the two fastening members by the fastening element penetrating the holes of the two fastening members and the hole of the tang;
   wherein protruding ends of the movement limiter are configured to limit movement of the quick release system by preventing the quick release system from touching the ball bearing housing.

2. The revolute joint of claim 1, wherein the movement limiter is a rubber bushing.

3. The revolute joint of claim 1, wherein the movement limiter is a plastic bushing.

4. The revolute joint of claim 1, wherein the movement limiter is interchangeable.

5. The revolute joint of claim 1, wherein the wide upper part of the movement limiter has a width such that the ends protruding outside the clevis limit rotation of the quick release system to be maximally 130 degrees in relation to a longitudinal axis of the ball bearing post.

6. The revolute joint of claim 1, wherein the wide upper part of the movement limiter has a width such that the ends protruding outside the space between the fastening members limit rotation of the quick release system from 90 to 130 degrees in relation to a longitudinal axis of the ball bearing post.

7. The revolute joint of claim 1, wherein the fastening element is a pin or screw posts.

8. A jumping rope comprising a revolute joint of claim 1.

9. An exercise kit comprising the jumping rope of claim 8, a multitude of interchangeable movement limiters each one configured to fit into the U-shaped clevis such that the narrow lower part is supported by a bottom of the recess between the fastening members, and ends of the wide upper part are configured to protrude into two opposite directions outside of the space between the fastening members, and optionally a multitude of interchangeable jumping rope cables.

* * * * *